(12) United States Patent
Quinn

(10) Patent No.: US 11,284,731 B2
(45) Date of Patent: Mar. 29, 2022

(54) PORTABLE FOOD POUCH SUPPORT

(71) Applicant: William S Quinn, Grosse Pointe Park, MI (US)

(72) Inventor: William S Quinn, Grosse Pointe Park, MI (US)

(73) Assignee: Caatailantennas LLC, Grosse Pointe, MI (US)

( * ) Notice: Subject to any disclaimer, the term of this patent is extended or adjusted under 35 U.S.C. 154(b) by 0 days.

(21) Appl. No.: 16/911,656

(22) Filed: Jun. 25, 2020

(65) Prior Publication Data

US 2021/0401208 A1     Dec. 30, 2021

(51) Int. Cl.
*A47G 23/06*     (2006.01)
*F16M 13/04*     (2006.01)

(52) U.S. Cl.
CPC ............. *A47G 23/06* (2013.01); *F16M 13/04* (2013.01); *A47G 2023/0675* (2013.01)

(58) Field of Classification Search
CPC . A47G 23/06; A47G 2023/0675; F16M 13/04
USPC ......... 206/557, 562, 564, 565; 224/182, 269
See application file for complete search history.

(56) References Cited

U.S. PATENT DOCUMENTS

| | | | | | |
|---|---|---|---|---|---|
| 2,304,705 | A | * | 12/1942 | Pate | A47G 23/06 224/258 |
| 4,587,757 | A | * | 5/1986 | Lirette | A01K 97/00 224/200 |
| 4,696,420 | A | * | 9/1987 | Kulik | A61G 5/10 224/275 |
| 4,715,293 | A | * | 12/1987 | Cobbs | A47B 23/002 108/43 |
| 5,074,222 | A | * | 12/1991 | Welch | A47B 23/002 108/43 |
| 5,662,047 | A | * | 9/1997 | Metcalf | B60N 3/005 108/44 |
| 5,667,119 | A | * | 9/1997 | Florence | B60N 3/004 224/281 |
| 6,019,264 | A | * | 2/2000 | Strieber | F16M 13/00 224/270 |
| 6,045,017 | A | * | 4/2000 | Connell | A45F 5/02 224/148.4 |
| 7,565,864 | B2 | * | 7/2009 | Hart | A47J 36/24 206/558 |
| 2006/0054649 | A1 | * | 3/2006 | Tippmann | A47G 23/06 224/625 |
| 2006/0076382 | A1 | * | 4/2006 | Housman | A45F 5/00 224/671 |
| 2007/0257074 | A1 | * | 11/2007 | Harrison | A63B 57/20 224/269 |

(Continued)

*Primary Examiner* — Jacob K Ackun
(74) *Attorney, Agent, or Firm* — Panagos Kennedy PLLC; Bill Panagos; Linda Kennedy

(57) ABSTRACT

A portable food tray is provided that attaches to outwear in use and is stowable in a pocket of a garment when not in use. The tray may have a flat, plastic and/or rigid base. The base may have an opening in a central portion of the base. One or more straps may span the opening and have a length that longer than the distance across the opening such that the one or more straps form a pocket. The pocket may be sized and shaped so an MRE pouch fits in the pocket and a portion of the MRE pouch that includes the opening is above the base. The base also has extensions that can be secured into a tactical vest for use.

15 Claims, 2 Drawing Sheets

(56) References Cited

U.S. PATENT DOCUMENTS

2013/0320005 A1\* 12/2013 Bardwell ............... A47G 23/06
                                                                          220/4.24
2014/0251866 A1\*  9/2014 Smallman ................ B65D 1/34
                                                                          206/557

\* cited by examiner

PORTABLE FOOD POUCH SUPPORT

TECHNICAL FIELD

This disclosure relates to portable support for food pouches such as military ready-to-eat (MRE) food pouches.

BACKGROUND

In many applications, such as long distance hiking or military deployments, people seek to minimize the weight they must carry on their persons. For example, people tend not to carry much traditional food with them because it is both bulky and heavy. Rather, it is common to carry MRE food pouches. No preparation is required to eat MREs; they are pre-cooked and can be eaten right out of the pouch. They do not require refrigeration, and generally have a three-to-seven year shelf life depending on storage environment and other factors.

Traditionally, eating from these pouches can present challenges. The pouches do not readily rest on surfaces and stay open in a way that makes it easy for a user to eat from them. Conventional solutions generally involved finding a resting place and using whatever implements are available to help secure the pouch while eating with one hand and using other hand to support the implements and/or pouch.

It is desired to have a support for a food pouch that is light weight and portable so it can be stored into a standard sized pocket. It is desired to have a support for a food pouch that is readily attachable to and detachable from hiking or military gear, such as a tactical vest. It is desired to have a food tray designed specifically for a pouch, making eating much easier from a sitting or standing position, and making eating with one hand more feasible.

DETAILED DESCRIPTION

All figures and examples herein are intended to be non-limiting; they are mere exemplary iterations and/or illustrative embodiments of the claims appended to the end of this description. Modifications to specifically-described units, systems, the order of steps in processes, etc., are contemplated. The portable food trays, systems and methods are capable of other embodiments and of being practiced and carried out in various ways. Also, it is to be understood that the phraseology and terminology employed herein are for the purpose of the description and should not be regarded as limiting. Moreover, discussion of the related art throughout the specification should in no way be considered as an admission that such related art is widely known or forms part of common general knowledge in the field.

Figure 1:
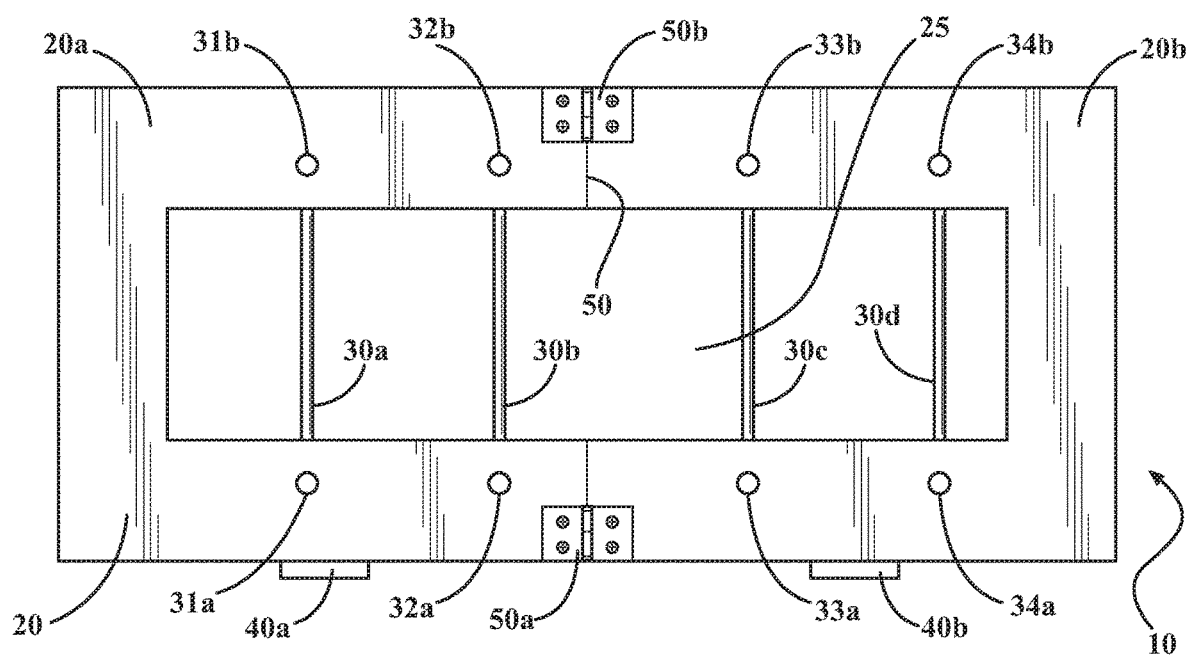
FIG. 1 is top view of an exemplary portable food tray in an open position.

Referring to FIG. 1, an exemplary portable food tray 10 is disclosed. Tray 10 comprises a base 20 formed of base portion 20a and base portion 20b that collectively form a perimeter around opening 25. As illustrated, the base 20 supports a pocket comprising a plurality of straps 30a, 30b, 30c, and 30d. Strap 30a is attached to the base 20 at connection points 31a and 31b. Strap 30b is attached to the base 20 at connection points 32a and 32b. Strap 30c is attached to the base 20 at connection points 33a and 33b. Strap 30d is attached to the base 20 at connection points 34a and 34b. The base 20 is foldable about an opening 50 using hinges 50a and 50b. The base includes extensions 40a and 40b that extend from the base and are insertable into straps or webbing on a garment such as a tactical vest. Generally, extensions 40a and 40b extend from the base can be slid behind straps or webbing on a garment, such as military webbing on a military tactical vest.

The base 20 can be made of any of a number of materials, so long as the materials are sufficiently rigid to support an MRE, which are generally from about 8 oz to about 26 oz., and an eating utensil, without undue bending expected to cause spillage. Such materials include lightweight metals (e.g., aluminum) and plastic materials. By way of non-limiting example, such plastic material may be one or more of polystyrene, polycarbonate, acrylic, or polymethyl methacrylate. Base 20 may be one a single sheet or may be in multiple hinged or foldable portions. Base 20 is illustrated as having two separate portions joined by hinges, but it is also contemplated that the base could be a single piece that may optionally have a creased or weakened fold line or lines permitting folding for storage in pockets of a size typically found in standard issue military attire, whether in pants, shirts, or outerwear.

As illustrated, base 20 is flat and rectangular, but other shapes are contemplated. For example, base 20 may be oval, or it may have a section of a perimeter that is arcuate, or it may be rectangular rounded corners. The base 20 may be concave or have concave portions so that spillage may be caught by the base and less likely to slide off the base or onto a support garment. The base may also be sized and shaped to accommodate a standard military green book journal. It may also include recesses or apertures to accommodate other devices, including but not limited to beverage containers and eating utensils.

The base 20 is illustrated as having extensions for securement to a garment that are sufficiently rigid for sliding into receiving but it is contemplated that other securement devices could be used, including hook and loop fasteners on straps, ties, snaps, and clips. Where extensions are used, they may be fixed to the base 20 using any number of technologies. The extensions may be pivotally attached to the base 20, foldable onto the base 20, or statically fixed in position. The extensions may be removably securable in a position where the base 20 and the extensions are from 80 degrees to 100 degrees apart. Other angles between the base and extension are contemplated, including angles of about 85, 90, and 95 degrees. The extensions may be made from any number of materials. It is contemplated the extensions may be plastic and may be integrally formed with the base or separately attached to the base 20. The extensions may of the same or different material from the base 20. The extensions may be sized and shaped for insertion into straps into pockets or behind straps on garments, including straps on military tactical vests.

As illustrated, base 20 includes a rectangle-shaped opening 25. It is contemplated that the opening could be any of a number of shapes, including oval and rectangular with rounded corners. The opening 25 is sized and shaped to receive a pouch of food, like an MRE. In one embodiment, the opening is sized to receive a pouch that is about 8"× about 6"× about 1". Other sizes, larger and smaller, are contemplated. Such pouches are insertable into the opening to be supported by a pocket such that an opening of the pouch extends upwardly from a top surface of the base. Although as illustrated the pocket is a plurality of flexible straps, other forms of pockets are contemplated such a single cloth fabric pocket or a single netting pocket that supported at the base. Generally, the pocket is longer than necessary to span the opening 25 so it can support the bottom of the pouch below the surface of the base 20. The pocket may be of a material that is light weight and that resists tearing when food pouches are inserted into and extracted from the pocket. Many materials are contemplated, including nylon, polyester, polypropylene or military webbing. The pocket may be attached to the base using a mechanical attachment. In some embodiments, the pockets are attached through material that is knotted on the top surface of the base, where the material extends through one or more apertures on the base where the remainder of the pocket rises—below the bottom surface of the base. Other securement devices are contemplated, including but not limited to clips, snaps, and hook and loop fasteners.

Figure 2:
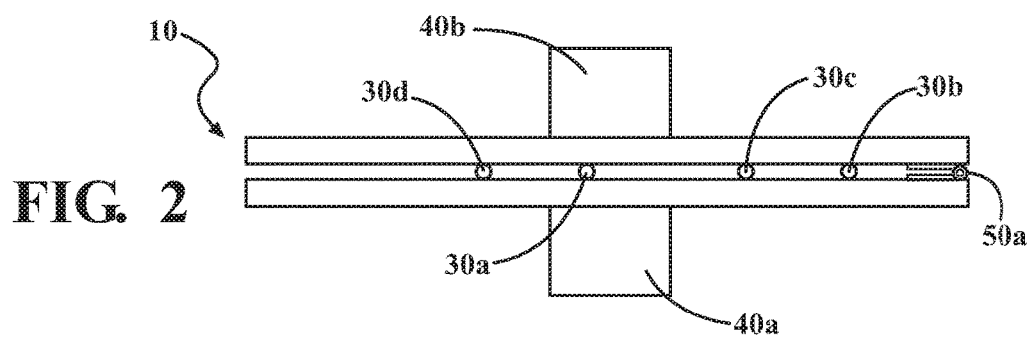
FIG. 2 is a side view of an exemplary portable food tray in a folded position.

FIG. 2 shows portable food tray 10 in a folded position, folded about hinge 50a and 50b (not shown). Extensions 40a and 40b extend in opposite directions. In some embodiments, the extensions are further foldable or pivotable or removable to minimize the profile of food tray 10 for storage. Straps 30a, 30b, 30c and 30d are spaced apart in a folded position to minimize the volume required to store food tray 10.

Figure 3:
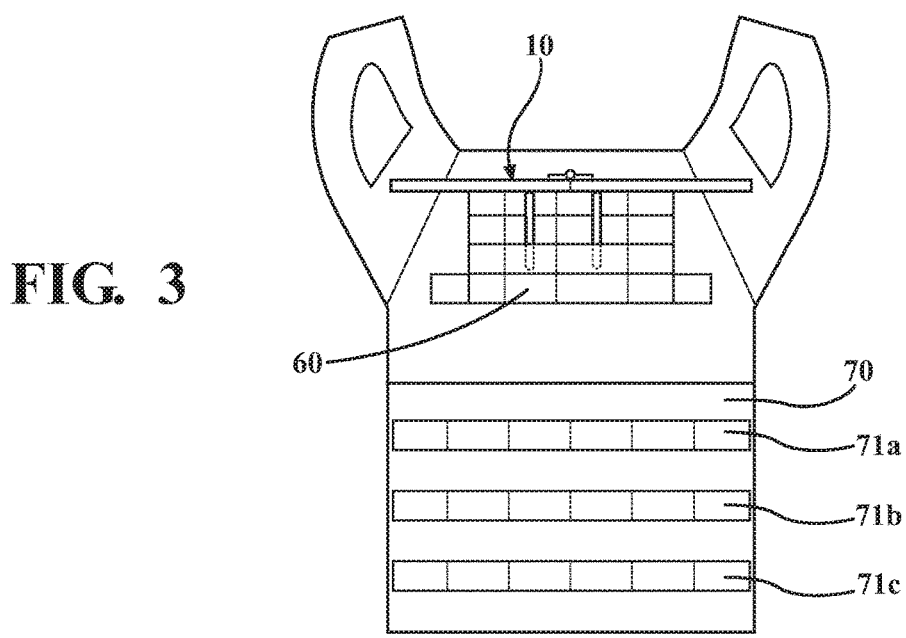
FIG. 3 is a front view of a portable food tray attached to a garment.

FIG. 3 shows garment 70, depicted as a tactical vest, with a food tray 10 attached. Garment 70 has a series of straps 71a, 71b, and 71c to support various tools, weapons and other gear. Garment 70 also has webbing 60 comprising straps that the extensions on food tray 10 are inserted into during use. Garment 70 can be any of a number of garments, including military and civilian vests, outerwear, and hiking gear.

Figure 4:
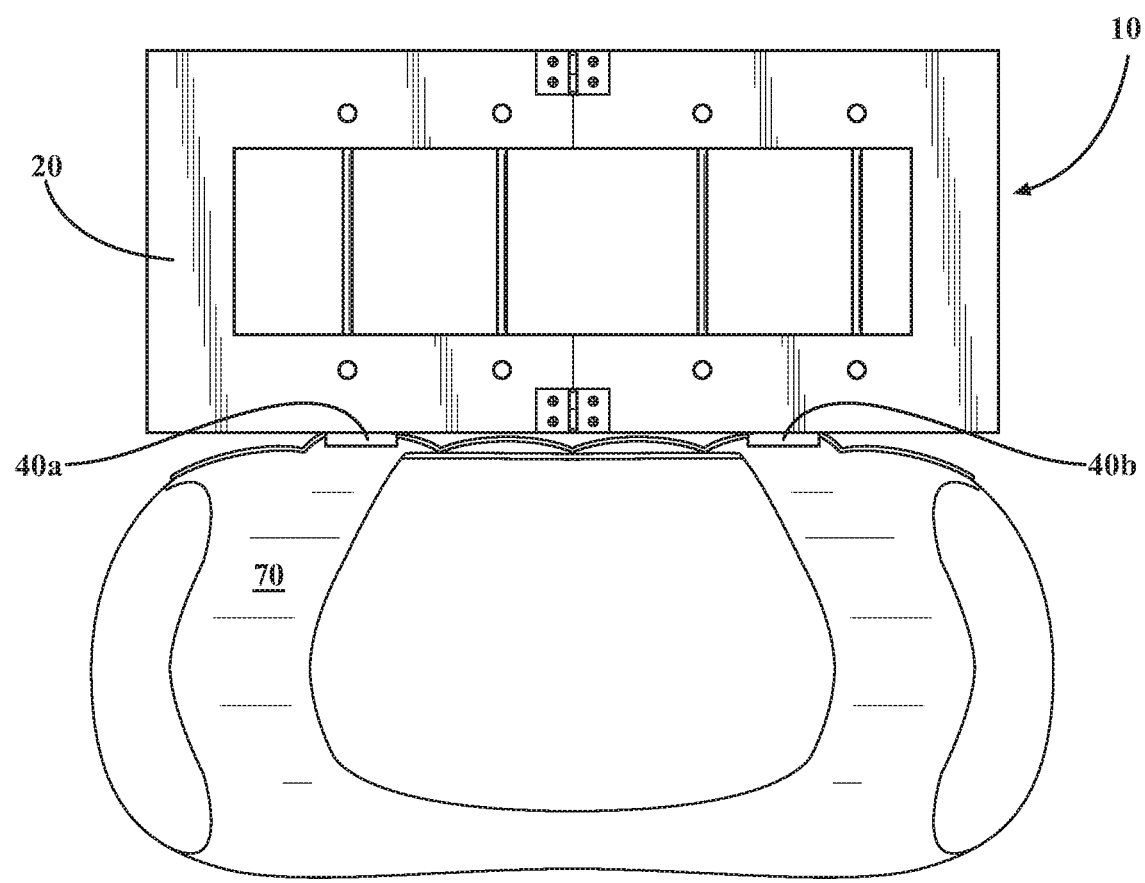
FIG. 4 is a top view of an exemplary portable food tray in an open position attached to a garment.

FIG. 4 shows a top view of food tray 10, in an open position with base 20 visible, attached to garment 70 via extensions 40a and 40b.

Figure 5:
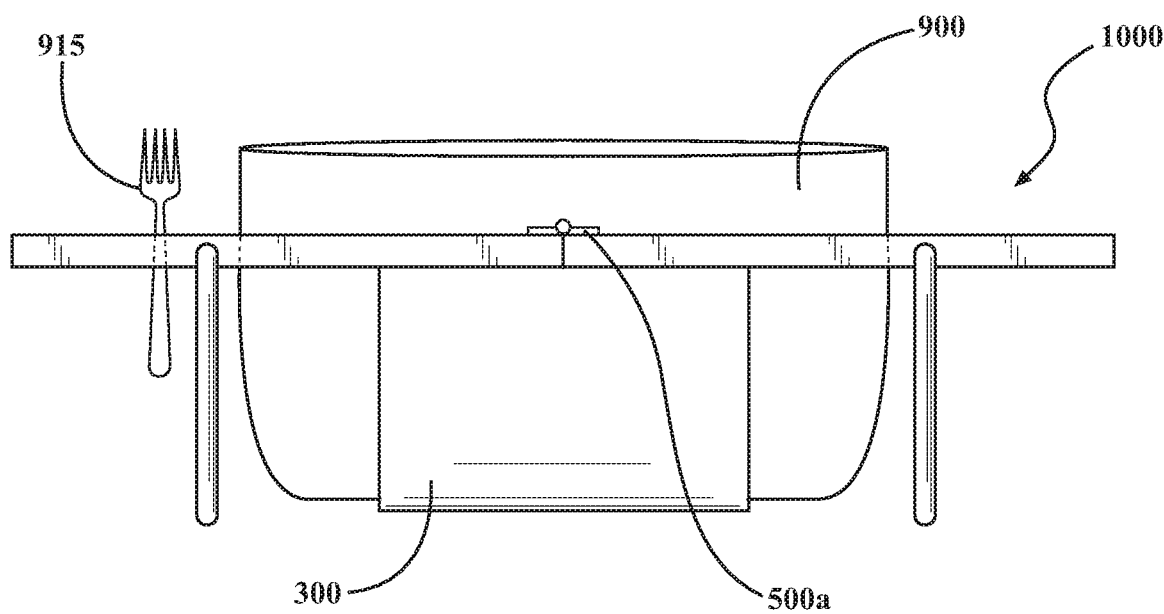
FIG. 5 is a back view of an exemplary portable food tray in an open position.

FIG. 5 shows another embodiment of food tray 1000 where pocket 300 is a single flexible cloth supporting food pouch 900. Food tray 1000 has an aperture (not shown) through which eating utensil 915 is removably insertable. Food tray 1000 is foldable with hinge 500a. Additional recesses and apertures may be included on or in food tray 1000 to accommodate different types of utensils, vessels, and other objects useful to a soldier, hiker, or other person.

With regard to the processes described herein, it should be understood that, although the steps of such processes, have been described as occurring in a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and processes will be incorporated into such future embodiments. The invention is capable of modification and variation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," recite one or more of the indicated elements unless a claim recites an explicit limitation to the contrary.

What is claimed as new and desired to be protected by Letters Patent of the United States is:

1. A portable food tray, comprising:
   a wearable combination of a foldable rigid base and a plurality of rigid planar extensions extending perpendicularly from the base along a first side of the base, wherein;
   (a) in a wearable open position, the base is unfolded with a top surface exposed and the base has an opening and a flexible pocket extending from a first side of the opening to a second side of the opening, the pocket being attached to the base; and the extensions extend from the base in a direction common to all of the extensions; and
   (b) in a stowable closed position, the base is folded with a bottom surface exposed and the top surface concealed, and at least one of the extensions extends from the base in a direction opposite from at least one other extension.

2. The portable food tray of claim 1, wherein the pocket comprises one or more straps attached to opposing sides of the opening.

3. The portable food tray of claim 2, wherein the straps comprise at least one of nylon, polyester, polypropylene or military webbing.

4. The portable food tray of claim 1, wherein the base comprises plastic.

5. The portable food tray of claim 4, wherein the plastic comprises at least one of polystyrene, polycarbonate, acrylic, or polymethyl methacrylate.

6. The portable food tray of claim 1, wherein the base is formed from two separate base portions connected by a plurality of hinges, wherein each base portion has at least one extension extending therefrom.

7. The portable food tray of claim 1 wherein the flexible pocket consists of a single strap of flexible cloth.

8. The portable food tray of claim 1 wherein the base further includes at least one aperture sized and shaped to support an eating utensil.

9. The portable food tray of claim 1 wherein the opening and the pocket are sized and shaped to receive and support a food pouch that is up to 8"×6"1" and that ranges from 8 oz to 26 oz.

10. The portable food tray of claim 1 wherein, in the wearable open position, the extensions are sized and shaped to be insertable into receiving structure on a vest.

11. The portable food tray of claim 1 wherein, in the wearable open position, the extensions are sized and shaped to be insertable behind a strap on a front side of a military tactical vest.

12. A portable food tray, comprising:
    a wearable combination of a foldable base and a plurality of extensions extending perpendicularly from the base, wherein;

(a) the base having an opening in a central portion of the base;
(b) one or more straps spanning the opening, the one or more straps being longer than necessary to span the opening, thereby forming a pocket in the opening; and
(c) one or more extensions extending from the base along a first side of the base in a first direction and substantially perpendicular to the base in an open position, where, in a closed position, at least one extension extends from the base in a first direction and at least one extension extends from the base second direction opposite the first direction.

13. The portable food tray of claim 12, wherein the base and the extensions are plastic.

14. The portable food tray of claim 12 wherein the strap is a lone strap spanning the opening, the strap consisting of flexible cloth.

15. The portable food tray of claim 12 wherein the base further includes at least one aperture sized and shaped to support an eating utensil.

\* \* \* \* \*